United States Patent
Otaka

(10) Patent No.: US 11,523,322 B2
(45) Date of Patent: Dec. 6, 2022

(54) CONTROL APPARATUS AND PROGRAM

(71) Applicant: HONDA MOTOR CO.,LTD., Tokyo (JP)

(72) Inventor: Masaru Otaka, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/118,626

(22) Filed: Dec. 11, 2020

(65) Prior Publication Data

US 2021/0099938 A1   Apr. 1, 2021

Related U.S. Application Data

(63) Continuation of application No. PCT/JP2019/023571, filed on Jun. 13, 2019.

(30) Foreign Application Priority Data

Jun. 15, 2018 (JP) ............................. JP2018-114430

(51) Int. Cl.
*H04W 36/38* (2009.01)
*H04W 36/24* (2009.01)
*H04W 36/00* (2009.01)

(52) U.S. Cl.
CPC ....... *H04W 36/24* (2013.01); *H04W 36/0072* (2013.01); *H04W 36/38* (2013.01); *H04W 36/03* (2018.08)

(58) Field of Classification Search
CPC ...... H04W 36/00; H04W 36/24; H04W 36/32
See application file for complete search history.

(56) References Cited

U.S. PATENT DOCUMENTS

| | | |
|---|---|---|
| 10,518,769 B2 | 12/2019 | Sen |
| 2011/0014912 A1 | 1/2011 | Ahluwalia |
| 2011/0130894 A1 | 6/2011 | Kim |
| 2011/0317669 A1* | 12/2011 | Inoue ............... H04W 36/30 370/332 |
| 2013/0016639 A1 | 1/2013 | Xu |
| 2014/0010185 A1 | 1/2014 | Morita |
| 2014/0213258 A1 | 7/2014 | Dahlen |
| 2016/0373988 A1 | 12/2016 | Fudaba |

(Continued)

FOREIGN PATENT DOCUMENTS

| | | |
|---|---|---|
| JP | H03226031 A | 10/1991 |
| JP | 2008092332 A | 4/2008 |

(Continued)

OTHER PUBLICATIONS (ISA/237) Written Opinion of the International Search Authority for International Patent Application No. PCT/JP2019/023571, issued/mailed by the Japan Patent Office dated Aug. 6, 2019.

(Continued)

*Primary Examiner* — Michael T Vu

(57) ABSTRACT

Provided is a control apparatus including a connection control unit configured to control communication connection with a mobile station, and a handover control unit configured to carry out, in a case where the mobile station is a mobile station of a predetermined type, control over handover of the mobile station to a cell in a frequency band that is predetermined as a frequency band corresponding to the mobile station of the predetermined type.

18 Claims, 7 Drawing Sheets

(56) References Cited

U.S. PATENT DOCUMENTS

| | | |
|---|---|---|
| 2017/0245241 A1 | 8/2017 | Yu |
| 2018/0049073 A1 | 2/2018 | Dinan |
| 2018/0262887 A1* | 9/2018 | Futaki .................. H04W 88/04 |
| 2020/0322827 A1* | 10/2020 | Yao ..................... H04W 72/085 |

FOREIGN PATENT DOCUMENTS

| | | |
|---|---|---|
| JP | 2011517513 A | 6/2011 |
| JP | 2012169868 A | 9/2012 |
| JP | 2013516859 A | 5/2013 |
| JP | 2017011340 A | 1/2017 |
| JP | 2017174208 A | 9/2017 |
| JP | 2017207967 A | 11/2017 |
| JP | 2017533681 A | 11/2017 |
| WO | 2013055087 A1 | 4/2013 |
| WO | 2017046978 A1 | 3/2017 |

OTHER PUBLICATIONS

Office Action issued for counterpart Japanese Application No. 2020-525667, issued by the Japanese Patent Office dated Nov. 9, 2021 (drafted on Nov. 2, 2021).

Office Action issued for counterpart German Application 112019003026.4, issued by German Patent and Trade Mark Office dated Feb. 28, 2022.

Office Action issued for counterpart Japanese Application No. 2020-525667, issued by the Japanese Patent Office dated May 31, 2022 (drafted on May 26, 2022).

* cited by examiner

CONTROL APPARATUS AND PROGRAM

The contents of the following Japanese patent application are incorporated herein by reference:
NO. 2018-114430 filed in JP on Jun. 15, 2018, and
NO. PCT/JP2019/023571 filed in WO on Jun. 13, 2019

BACKGROUND

1. Technical Field

The present invention relates to a control apparatus and a program.

2. Related Art

A technology has been proposed with which automated driving, remote driving, and the like are realized when a vehicle performs communication via a mobile phone network (for example, see Patent Document 1).

CITATION LIST

Patent Documents

[Patent Document 1] Japanese Unexamined Patent Application Publication No. 2017-207967
[Patent Document 2] Japanese Unexamined Patent Application Publication No. 2017-174208

Technical Problem

For example, when a process for suspending the automated driving, the remote driving, and the like of vehicles is needed in a case where the number of pieces of communication equipment in a cell where the vehicles are present is increased and congestion or the like occurs, an importance for avoiding the congestion may differ depending on a type of a mobile station.

DESCRIPTION OF EXEMPLARY EMBODIMENTS

Hereinafter, the present invention will be described by way of embodiments of the invention, but the following embodiments are not intended to limit the invention specified in the claims. In addition, not all combinations of features described according to the embodiments are necessarily imperative to solving means of the invention.

A control apparatus 100 according to the present embodiment may control a wireless base station. The control apparatus 100 may control wireless base stations in conformity to a long term evolution (LTE) communication system, a 4th generation (4G) communication system, a 5th generation (5G) communication system, and communication systems developed after the 5G.

Herein, an example in which the control apparatus 100 controls an eNB 30 will be mainly used for description. The control apparatus 100 may be arranged inside the eNB 30. The control apparatus 100 may also be arranged outside the eNB 30. The control apparatus 100 may also function as the eNB 30.

The control apparatus 100 controls communication connection with a mobile station. When the mobile station is a mobile station of a predetermined type, the control apparatus 100 according to the present embodiment carries out control over handover of the mobile station to a cell in a frequency band that is predetermined as a frequency band corresponding to the mobile station of the predetermined type (which may be referred to as a frequency band for the predetermined type). An example of the mobile station of the predetermined type may include a vehicle. It is noted that the mobile station of the predetermined type is not limited thereto, and may also be a mobile station of any type, for example, various IoT devices, an unmanned aircraft, and the like.

Herein, a case where the mobile station of the predetermined type is a vehicle will be mainly used as an example for description. In a case where it is determined that the mobile station is a vehicle, the control apparatus 100 carries out control over the handover of the mobile station to a cell in a frequency band that is predetermined as a frequency band corresponding to the vehicle (which may be referred to as a frequency band for vehicles). The frequency band for vehicles may be a frequency band determined to be exclusive for vehicles.

Figure 1:
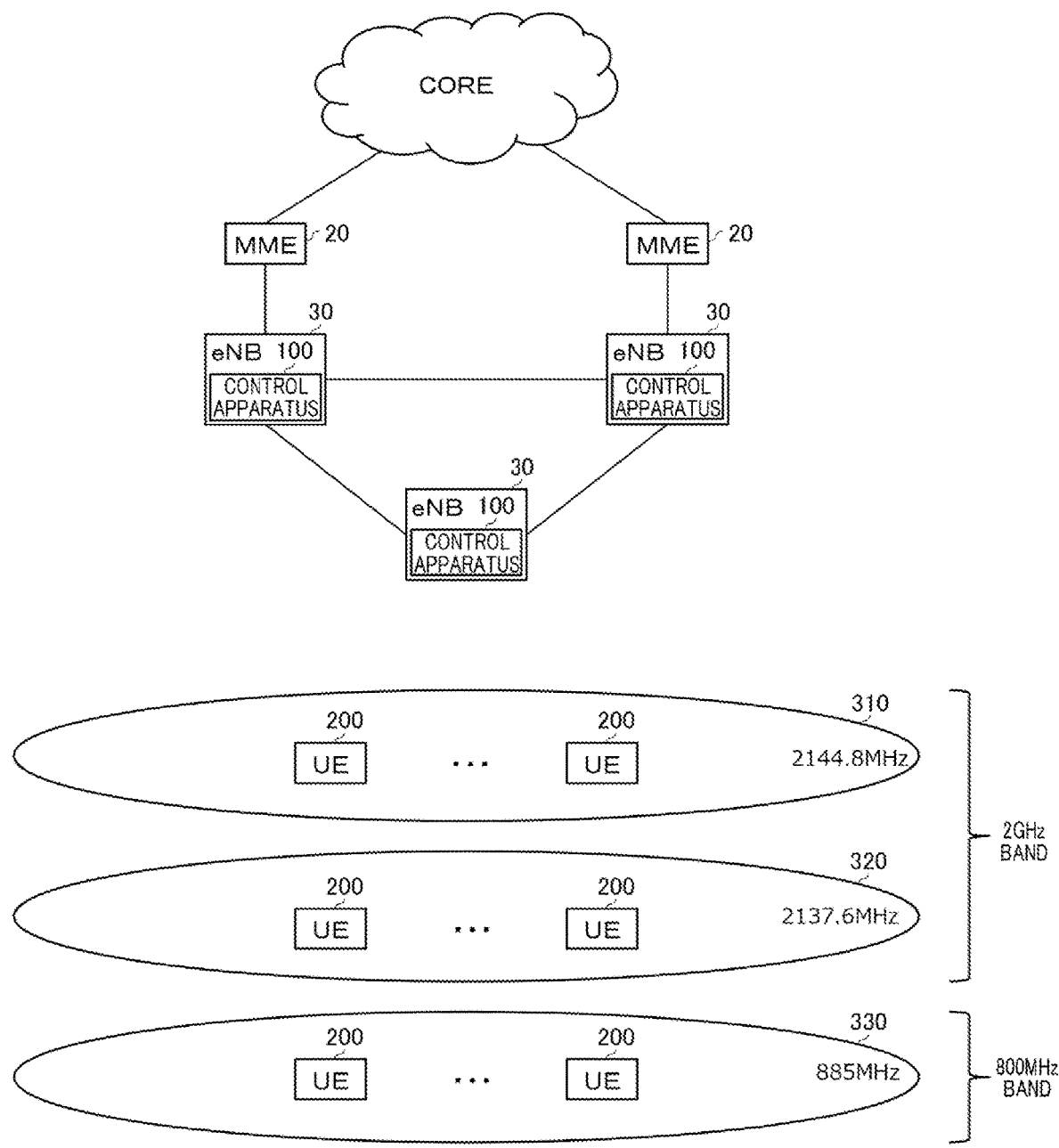
FIG. 1 schematically illustrates one example of a communication environment of a control apparatus 100.

In FIG. 1, a cell 310, a cell 320, and a cell 330 are exemplified as cells generated by the eNB 30. The number of cells generated by the eNB 30 is not limited to the number illustrated in FIG. 1, and the frequency bands of the cells are not limited to the frequency bands illustrated in FIG. 1. The cell 310 and the cell 320 exemplified in FIG. 1 are cells in a 2 GHz band, and the cell 330 is a cell in an 800 MHz. The cell 310, the cell 320, and the cell 330 may be generated by a single eNB 30. In addition, the cell 310, the cell 320, and the cell 330 may also be generated by a plurality of eNBs 30. Herein, a case where the cell 320 is a cell in a frequency band for vehicles will be used as an example for description.

The control apparatus 100 controls communication of an UE 200 serving as a mobile station. In a case where it is determined that the UE 200 is a vehicle, the control apparatus 100 carries out control over the handover of the UE 200 to the cell 320. For example, the control apparatus 100 sends, to the UE 200, wireless resource setting information corresponding to the frequency band of the cell 320. The wireless resource setting information is, for example, RRC Connection Reconfiguration.

The control apparatus 100 may hold in advance a handover threshold at which the mobile station tends to be present in the frequency band of the cell 320. The control apparatus 100 may send, to the UE 200, the wireless resource setting information including measurement configuration information at which the mobile station tends to be present in the frequency band of the cell 320. The measurement configuration information is, for example, Measurement Configuration (Meas config).

The measurement configuration information includes, for example, Measurement Object and Report Configuration. The present measurement object may include information indicating the frequency of the cell 320 as a frequency of the cell which is to be measured by the UE 200. In addition, the present measurement object may include information indicating a physical cell ID (PCI) of the cell 320 as an ID of the cell (PCI) which is to be measured by the UE 200. The UE 200 carries out the measurement based on the received wireless resource setting information, and sends Measurement Report to the control apparatus 100.

As a result of the above-described procedure, a handover process for handing over the UE 200 to the cell 320 is carried out, and the UE 200 is present in the cell 320.

Figure 2:
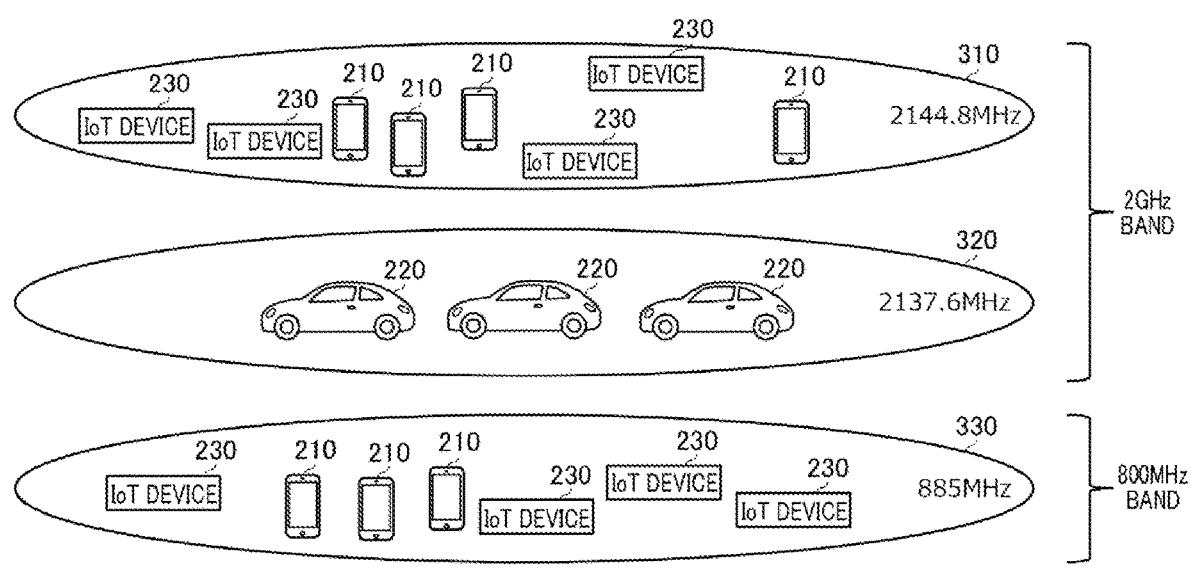
FIG. 2 schematically illustrates one example of a flow of a process by user equipment (UE) 200, an evolved NodeB (eNB) 30, and a mobility management entity (MME) 20.
Figure 3:
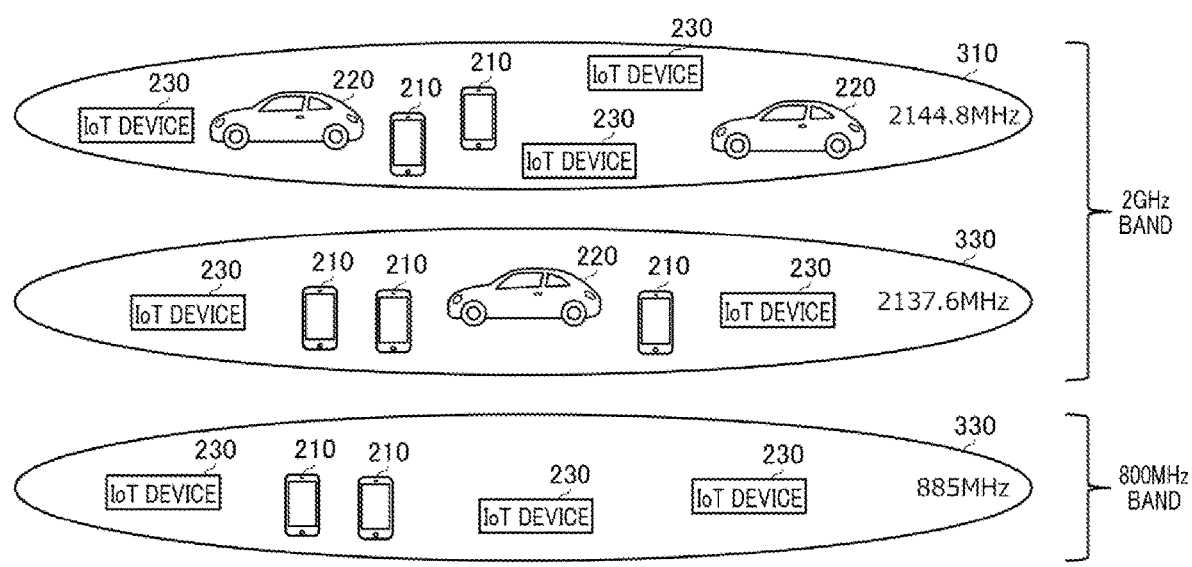
FIG. 3 schematically illustrates one example of the flow of the process by the UE 200, the eNB 30, and the MME 20.

FIG. 2 illustrates one example of a presence status of the UE 200 which is achieved by the control apparatus 100, and FIG. 3 illustrates one example of the presence status of the UE 200 which is realized by conventional eNBs. FIG. 2 and FIG. 3 illustrate mobile phones 210, vehicles 220, and Internet of Thing (IoT) devices 230 as examples of the UE 200.

As a result of the control apparatus 100 according to the present embodiment carrying out the handover of the vehicles 220 to the cell 320, only the vehicles 220 are present in the cell 320, as illustrated in FIG. 2. The mobile phones 210 and the IoT devices 230 are not present in the cell 320, but are present in the cell 310 or the cell 330.

On the other hand, according to the conventional eNBs, as illustrated in FIG. 3, the mobile phones 210, the vehicles 220, and the IoT devices 230 are present in the cell 310, the cell 320, and the cell 330 in a mixed manner. In this case, in a case where the number of the UEs 200 in the cell 310 and the cell 320 in which the vehicles 220 are present is increased and congestion or the like occurs, for example, measures such as suspension of automated driving, remote driving, and the like of the vehicles 220 may be needed.

In contrast, when the control apparatus 100 according to the present embodiment is used, as compared with the related art, the number of the UEs 200 can be reduced in the cell 320 where the vehicles 220 are present. Thereby, it is also possible to smoothly perform the automated driving, the remote driving, and the like of the vehicles 220.

Figure 4:
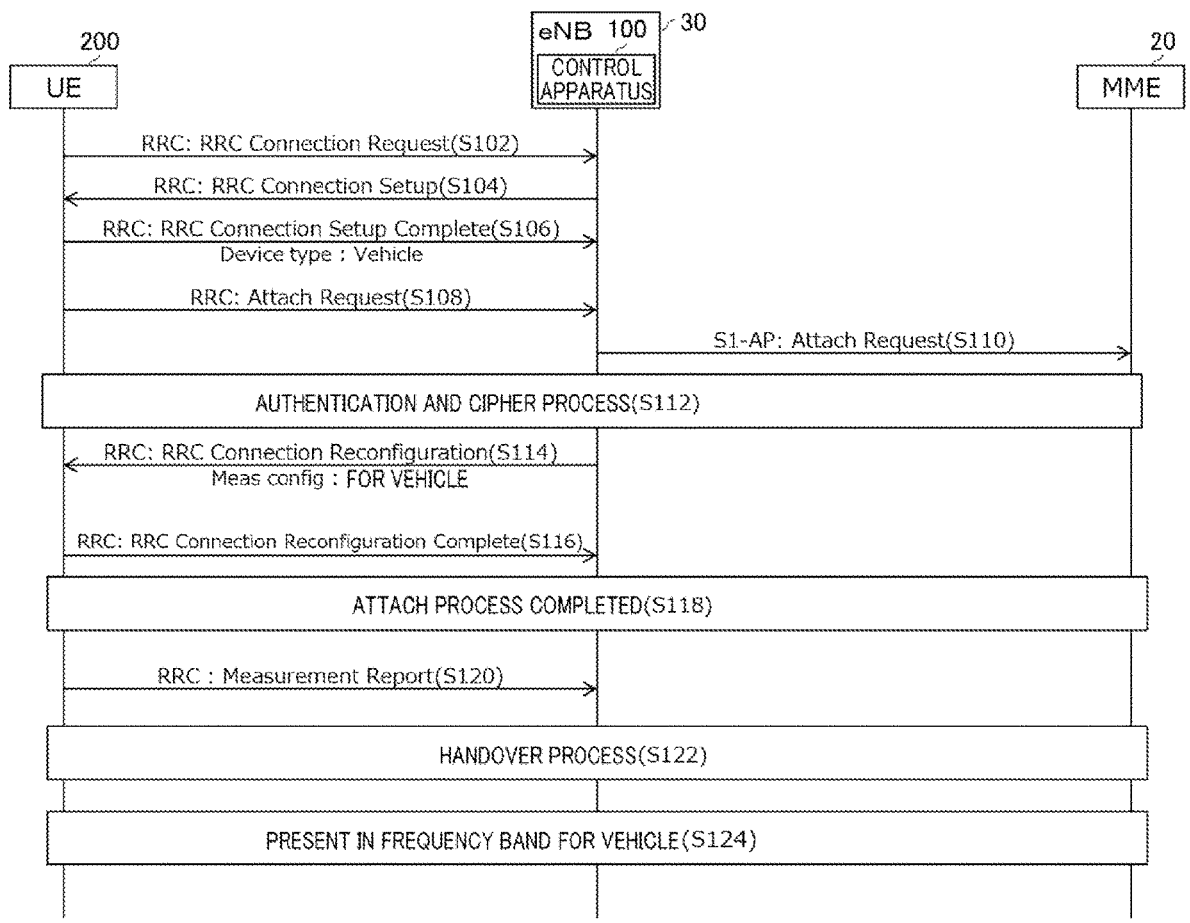
FIG. 4 schematically illustrates one example of a presence status of a vehicle 220 which is realized by control based on the control apparatus 100.

FIG. 4 schematically illustrates one example of a flow of a process by the UE 200, the eNB 30, and an MME 20. Herein, the UE 200 is a vehicle, and the flow of the process will be described from when the UE 200 sends a connection request, up to a point where the eNB 30 causes the UE 200 to be present in a frequency band for vehicles. The eNB 30 operates according to the control of the control apparatus 100.

In step (steps may be abbreviated as S) 102, the UE 200 sends RRC Connection Request to the eNB 30. In S104, the eNB 30 sends RRC Connection Setup to the UE 200.

In S106, the UE 200 sends RRC Connection Setup Complete to the eNB 30. In the present example, the UE 200 sends RRC Connection Setup Complete including "Device type: Vehicle" to the eNB 30. "Device type: Vehicle" may be one example of data indicating that the UE 200 is a vehicle.

In S108, the UE 200 sends Attach Request to the eNB 30. In S110, the eNB 30 sends Attach Request to the MME 20. In S112, an authentication and cipher process is carried out.

In S114, the eNB 30 sends RRC Connection Reconfiguration to the UE 200. In the present example, the eNB 30 sends, to the UE 200, RRC Connection Reconfiguration including Meas config with which the the mobile station tends to transition to the frequency band for vehicles.

In S116, the UE 200 sends RRC Connection Reconfiguration Complete to the eNB 30. In S118, an Attach process is completed.

In S120, the UE 200 sends, to the eNB 30, Measurement Report for reporting a result of the measurement carried out according to the RRC Connection Reconfiguration received in S114. In S122, a handover process is carried out. Then, in S124, the UE 200 is present in the frequency band for vehicles.

Figure 5:
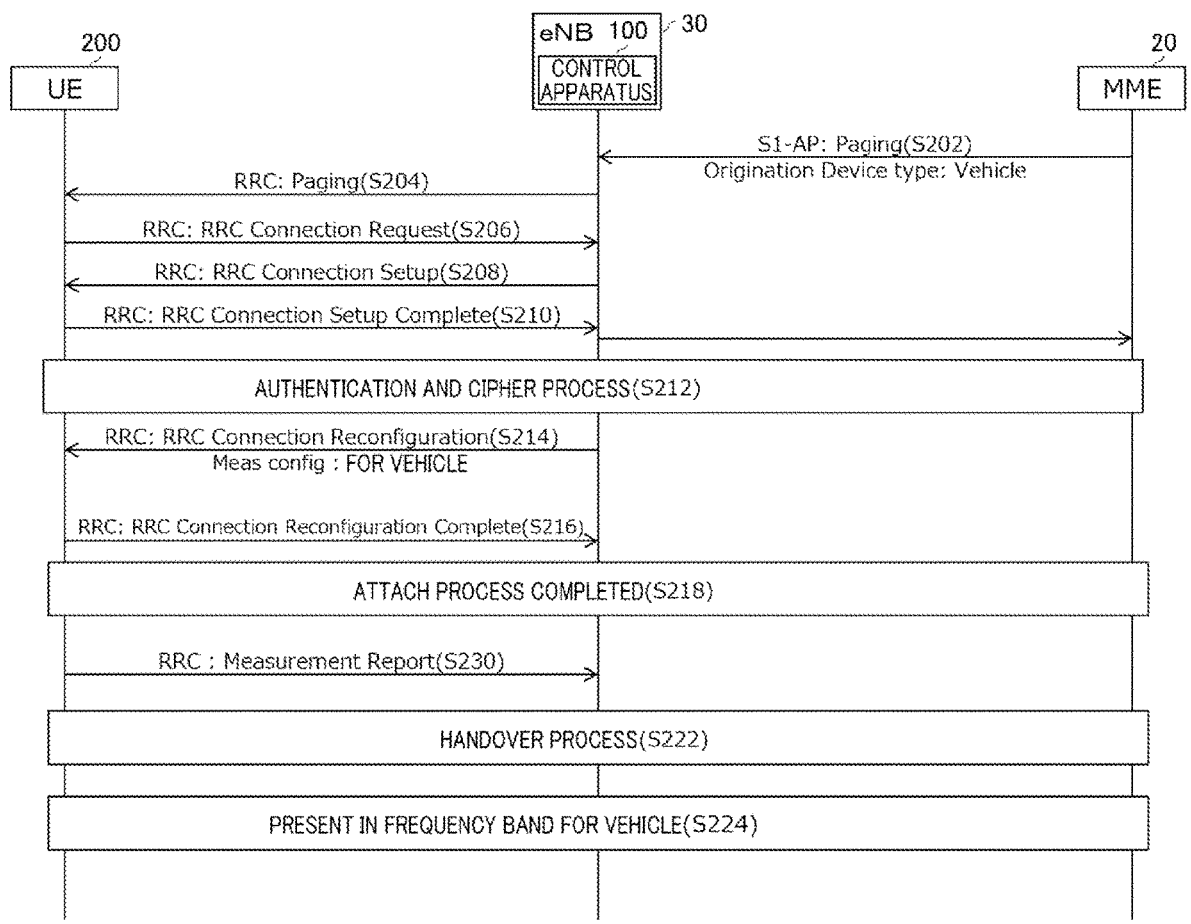
FIG. 5 schematically illustrates one example of the presence status of the vehicle 220 which is realized by a related-art eNB.

FIG. 5 schematically illustrates another example of the flow of the process by the UE 200, the eNB 30, and the MME 20. Herein, a flow of a process in a case where the UE 200 receives signals will be described up to a point where the eNB 30 causes the UE 200 to be present in the frequency band for vehicles. The eNB 30 operates according to the control of the control apparatus 100.

In S202, the MME 20 sends Paging to the eNB 30. In the present example, the MME 20 sends Paging including "Origination Device type: Vehicle" to the eNB 30. "Origination Device type: Vehicle" may be one example of data indicating that the UE 200 is a vehicle. In S204, the eNB 30 sends Paging to the eNB 30.

In S206, the UE 200 sends RRC Connection Request to the eNB 30. In S208, the eNB 30 sends RRC Connection Setup to the UE 200. In S210, the UE 200 sends RRC Connection Setup Complete to the eNB 30. In S212, the authentication and cipher process is carried out.

In S214, the eNB 30 sends RRC Connection Reconfiguration to the UE 200. In the present example, the eNB 30 sends, to the UE 200, RRC Connection Reconfiguration including Meas config with which the mobile station tends to transition to the frequency band for vehicles.

In S216, the UE 200 sends RRC Connection Reconfiguration Complete to the eNB 30. In S218, the Attach process is completed.

In S220, the UE 200 sends, to the eNB 30, Measurement Report for reporting a result of the measurement carried out according to the RRC Connection Reconfiguration received in S214. In S222, the handover process is carried out. Then, in S224, the UE 200 is present in the frequency band for vehicles.

Figure 6:
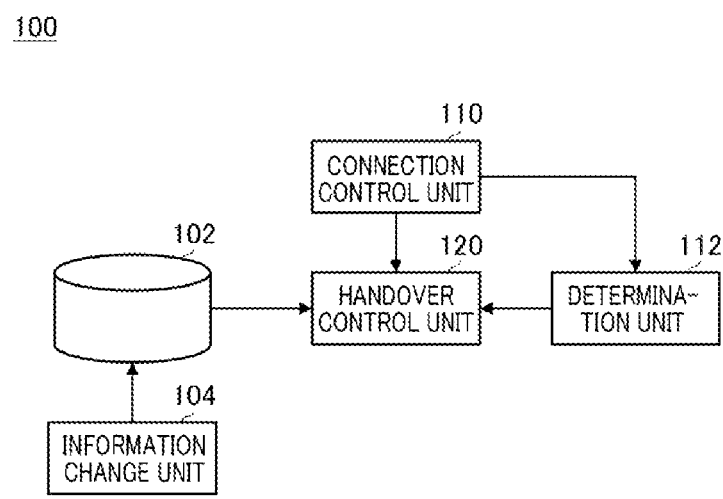
FIG. 6 schematically illustrates one example of a functional configuration of the control apparatus 100.

FIG. 6 schematically illustrates one example of a functional configuration of the control apparatus 100. The control apparatus 100 includes a storage unit 102, an information change unit 104, a connection control unit 110, a determination unit 112, a handover control unit 120.

The storage unit 102 stores various pieces of information. The storage unit 102 may store information indicating a frequency band for a predetermined type. The storage unit 102 stores, for example, information indicating the frequency band for vehicles. In addition, the storage unit 102 may store a handover threshold at which the mobile station tends to be present in the frequency band for the predetermined type. The storage unit 102 stores, for example, the handover threshold at which the mobile station tends to be present in the frequency band for vehicles. In addition, the storage unit 102 may store measurement configuration information with which the mobile station tends to be present in the frequency band for the predetermined type. The storage unit 102 stores, for example, the measurement configuration information with which the mobile station tends to be present in the frequency band for vehicles.

The information change unit 104 changes the information stored in the storage unit 102. The information change unit 104 may change the information indicating the frequency band for the predetermined type, for example, in a case where the frequency band for the predetermined type is changed or a case where the frequency band for the predetermined type is newly determined. The information change unit 104 changes the information indicating the frequency band for vehicles, for example, in a case where the frequency band for vehicles is changed or a case where the frequency band for vehicles is newly determined. The information change unit 104 may change the handover threshold at which the mobile station tends to be present in the frequency band for vehicles. In addition, the information change unit 104 may change the measurement configuration information with which the mobile station tends to be present in the frequency band for vehicles.

The connection control unit 110 controls communication connection with the mobile station. The connection control unit 110 sends and receives various pieces of information with the mobile station. In addition, the connection control unit 110 sends and receives various pieces of information with the MME 20.

The determination unit 112 determines a type of the mobile station based on the information received by the connection control unit 110. The determination unit 112 may determine whether the mobile station is a mobile station of the predetermined type based on the information received by the connection control unit 110. For example, the determination unit 112 determines whether the mobile station is a vehicle. In a case where the information received by the connection control unit 110 from the mobile station includes data indicating that the mobile station is a mobile station of the predetermined type, the determination unit 112 may determine that the mobile station is the mobile station of the predetermined type. For example, in a case where the information received by the connection control unit 110 from the mobile station includes data indicating that the mobile station is a vehicle, the determination unit 112 determines that the mobile station is the vehicle. The data indicating that the mobile station is the vehicle is, for example, data indicating a device type of the mobile station, and is data a content of which indicates the vehicle.

In a case where information indicating the connection completion which is received by the connection control unit 110 from the mobile station includes data indicating that the mobile station is a mobile station of a predetermined type, the determination unit 112 may determine that the mobile station is the mobile station of the predetermined type. For example, in a case where the information indicating the connection completion which is received by the connection control unit 110 from the mobile station includes data indicating that the mobile station is a vehicle, the determination unit 112 determines that the mobile station is the vehicle. For example, the information indicating the connection completion is RRC Connection Setup Complete.

In addition, for example, in a case where the connection request information received by the connection control unit 110 from the mobile station includes data indicating that the mobile station is a mobile station of a predetermined type, the determination unit 112 may determine that the mobile station is the mobile station of the predetermined type. For example. in a case where the connection request information received by the connection control unit 110 from the mobile station includes data indicating that the mobile station is a vehicle, the determination unit 112 determines that the mobile station is the vehicle. The connection request information is, for example, RRC Connection Request.

In addition, in a case where Attach Request received by the connection control unit 110 from the mobile station includes data indicating that the mobile station is a mobile station of a predetermined type, the determination unit 112 may determine that the mobile station is the mobile station of the predetermined type. For example, in a case where Attach Request received by the connection control unit 110 from the mobile station includes data indicating that the mobile station is a vehicle, the determination unit 112 determines that the mobile station is the vehicle. In a case where Direct Transfer received by the connection control unit 110 from the mobile station includes data indicating that the mobile station is a vehicle, the determination unit 112 may also determine that the mobile station is the vehicle.

The determination unit 112 may also determine whether the mobile station is the mobile station of the predetermined type based on information received by the connection control unit 110 from the MME 20. For example, the determination unit 112 determines whether the mobile station is a vehicle based on the information received by the connection control unit 110 from the MME 20. The determination unit 112 may determine that the mobile station is the vehicle in a case where the paging information received by the connection control unit 110 from the MME 20 includes data indicating that the mobile station is the vehicle.

The handover control unit 120 may carry out control over the handover of the mobile station to the cell in the frequency band for the predetermined type in a case where the mobile station is the mobile station of the predetermined type. For example, the handover control unit 120 carries out control over the handover of the mobile station to the cell in the frequency band for vehicles in a case where the mobile station is the vehicle. The handover control unit 120 may carry out control over the handover of the mobile station to the cell in the frequency band for vehicles in a case where the determination unit 112 determines that the mobile station is the vehicle.

The handover control unit 120 may carry out control over the handover of the mobile station to the cell in the frequency band for the predetermined type by sending wireless resource setting information corresponding to the frequency band for the predetermined type to the mobile station. For example, the handover control unit 120 carries out control over the handover of the mobile station to the cell in the frequency band for vehicles by sending the wireless resource setting information corresponding to the frequency band for vehicles to the mobile station. The wireless resource setting information is, for example, RRC Connection Reconfiguration.

The determination unit 112 may also determine whether the mobile station is the mobile station of the predetermined type in a predetermined state. In a case where it is determined that the mobile station is the mobile station of the predetermined type in the predetermined state, the handover control unit 120 may carry out control over the handover of the mobile station to the cell in a frequency band that is predetermined as a frequency band corresponding to the predetermined state. For example, the determination unit 112 may determine whether the mobile station is a remotely-driven vehicle set as an object of remote driving. Then, in a case where it is determined that the mobile station is the remotely-driven vehicle, the handover control unit 120 may carry out control over the handover of the mobile station to the cell in a frequency band that is predetermined as a frequency band corresponding to the remote driving. Thereby, a probability can be reduced that an event occurs where it is difficult for the remotely-driven vehicle to receive control signals based on the remote driving since congestion or the like occurs due to an increase of the number of pieces of communication equipment in the cell.

In addition, the determination unit 112 may also determine whether the mobile station is a remote driving apparatus that performs remote driving of a vehicle. Then, in a case where it is determined that the mobile station is the remote driving apparatus that performs the remote driving of the vehicle, the handover control unit 120 may carry out control over the handover of the mobile station to a cell in a frequency band that is predetermined as a frequency band corresponding to the remote driving. Thereby, a probability can be reduced that an event occurs where it is difficult for the control signals based on the remote driving which are sent by the remote driving apparatus to reach the vehicle since congestion or the like occurs due to an increase of the number of pieces of communication equipment in the cell.

The remote driving apparatus is, for example, a remote driving facility. The remote driving facility is a facility for remotely driving the vehicle 220 via a mobile phone network. The remote driving facility is, for example, a facility imitating a driver's seat of a motor vehicle. The remote driving facility has an operation unit configured to accept an operation by a remote driver who remotely drives the vehicle 220 using the remote driving facility, and a communication unit configured to send a control signal according to the operation on the operation unit to the vehicle 220. The operation unit includes operation members needed to drive the vehicle, such as a steering wheel, an accelerator pedal, a brake pedal, a shift lever, and a blinker lever. In addition, the operation unit may further include operation members configured to operate accessories such as a car navigation system, an air conditioner, audio, slide doors, a sunroof, and seat heaters. The communication unit receives an image in the vicinity of the vehicle 220 which is captured by an image capturing section included in the vehicle 220. The remote driving facility has a display unit configured to display the image in the vicinity of the vehicle 220 which is received by the communication unit. When the remote driver operates the operation unit by browsing the image displayed on the display unit, the remote driving of the vehicle 220 is realized.

In addition, the remote driving apparatus is, for example, a remote driving vehicle having a function of remotely driving a vehicle. The remote driving vehicle is a motor vehicle having a remote driving function of remotely driving the vehicle 220 via the mobile phone network. The remote driving vehicle may be able to perform driving based on an operation on the operation unit included in the remote driving vehicle (which may be referred to as manual driving). In addition, the remote driving vehicle may also be able to perform so-called automated driving.

The remote driving vehicle has an operation unit configured to accept an operation by a remote driver who remotely drives the vehicle 220 using the remote driving vehicle, and a communication unit configured to communicate with the vehicle 220. The operation unit includes operation members needed to drive the vehicle, such as a steering wheel, an accelerator pedal, a brake pedal, a shift lever, and a blinker lever. In addition, the operation unit may further include operation members configured to operate accessories such as an air conditioner, audio, a car navigation system, slide doors, a sunroof, and seat heaters. The communication unit receives an image in the vicinity of the vehicle 220 which is captured by an image capturing section included in the vehicle 220. The remote driving vehicle has a display unit configured to display the image in the vicinity of the vehicle 220 which is received by the communication unit. The remote driving vehicle has, for example, a manual driving mode and a remote driving mode, where in the manual driving mode, travelling is performed according to the operation on the operation unit, and in the remote driving mode, a signal according to the operation on the operation unit is sent to the vehicle 220. The remote driver can remotely drive the vehicle 220, for example, by switching the remote driving vehicle parked in a parking space at home into the remote driving mode.

Figure 7:
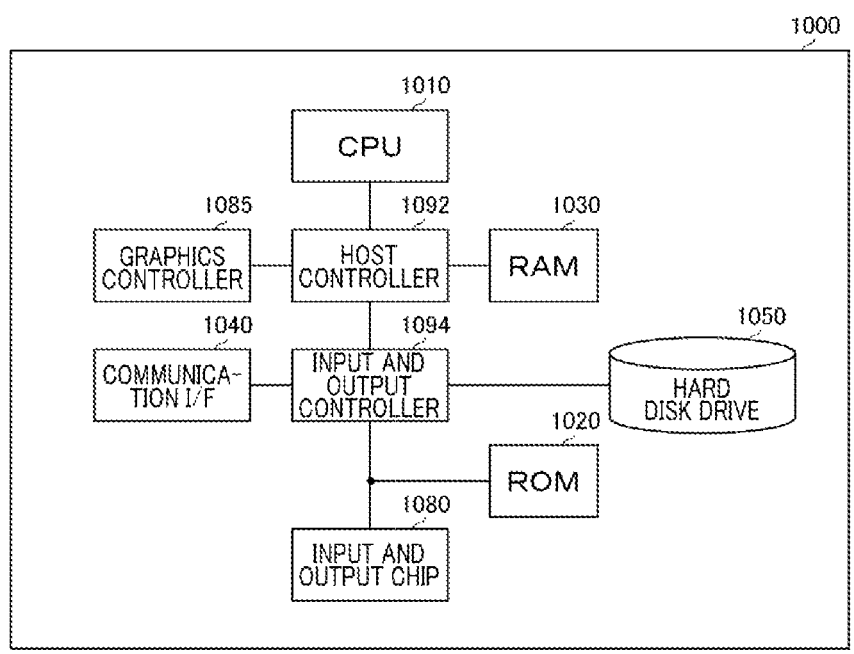
FIG. 7 schematically illustrates one example of a hardware configuration of a computer 1000 that functions as the control apparatus 100.

FIG. 7 schematically illustrates one example of a computer 1000 that functions as the control apparatus 100. The computer 1000 according to the present embodiment includes a CPU peripheral section having a CPU 1010, a RAM 1030, and a graphics controller 1085 which are mutually connected by a host controller 1092, and an input and output section having a ROM 1020, a communication I/F 1040, a hard disk drive 1050, and an input and output chip 1080 which are connected to the host controller 1092 by an input and output controller 1094.

The CPU 1010 operates based on programs stored in the ROM 1020 and the RAM 1030 and performs control of each section. The graphics controller 1085 obtains image data to be generated by the CPU 1010 or the like on a frame buffer disposed in the RAM 1030 and displays an image on a display. Instead of this, the graphics controller 1085 may also include therein a frame buffer configured to store the image data to be generated by the CPU 1010 or the like.

The communication I/F 1040 communicates with another apparatus via a network. In addition, the communication I/F 1040 functions as hardware configured to perform communication. The hard disk drive 1050 stores a program and data used by the CPU 1010.

The ROM 1020 stores a boot program carried out by the computer 1000 at the time of activation, a program dependent on the hardware of the computer 1000, and the like. The input and output chip 1080 connects various input and output apparatuses to the input and output controller 1094, for example, via a parallel port, a serial port, a keyboard port, a mouse port, and the like.

The program provided to the hard disk drive 1050 via the RAM 1030 is stored in a recording medium such as an IC card and provided to a user. The program is read out from the recording medium, installed into the hard disk drive 1050 via the RAM 1030, and carried out by the CPU 1010.

The program installed in the computer 1000 and configured to cause the computer 1000 to function as the control apparatus 100 may interact with the CPU 1010 or the like and cause the computer 1000 to respectively function as the respective sections of the control apparatus 100. Information processes described in these programs are read into the computer 1000 to function as the storage unit 102, the information change unit 104, the connection control unit 110, the determination unit 112, and the handover control unit 120 serving as specific means where the software and the above-described various hardware resources work in cooperation with each other. Then, when these specific means realize the calculation or process of information in accordance with an intended use of the computer 1000 according to the present embodiment, the control apparatus 100 that is specific in accordance with the intended use is constructed.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

20 MME, 30 eNB, 100 control apparatus, 102 storage unit, 104 information change unit, 110 connection control unit, 112 determination unit, 120 handover control unit, 200 UE, 210 mobile phone, 220 vehicle, 230 IoT device, 310 cell, 320 cell, 330 cell, 1000 computer, 1010 CPU, 1020 ROM, 1030 RAM, 1040 communication I/F, 1050 hard disk drive, 1080 input and output chip, 1085 graphics controller, 1092 host controller, 1094 input and output controller

What is claimed is:

1. A control apparatus comprising:
    a connection control unit configured to control communication connection with a mobile station; and
    a handover control unit configured to carry out, in a case where the mobile station is a mobile station of a predetermined type, control over handover of the mobile station to a cell in a frequency band that is predetermined as a frequency band corresponding to the mobile station of the predetermined type,
    wherein as a result of the control apparatus carrying out the handover of the mobile station to the cell in the frequency band that is predetermined as the frequency band corresponding to the mobile station of the predetermined type, only mobile stations of the predetermined type are present in the cell in the frequency band that is predetermined as the frequency band corresponding to the mobile station of the predetermined type, and
    wherein mobile stations having types other than the predetermined type are not present in the cell in the frequency band that is predetermined as the frequency band corresponding to the mobile station of the predetermined type.

2. The control apparatus according to claim 1, wherein the handover control unit is configured to carry out, in a case where the mobile station is a vehicle, control over the handover of the mobile station to a cell in a frequency band that is predetermined as a frequency band corresponding to the vehicle.

3. The control apparatus according to claim 1, comprising:
    a determination unit configured to determine a type of the mobile station based on information received by the connection control unit.

4. The control apparatus according to claim 3, wherein:
    the determination unit is configured to determine whether the mobile station is a vehicle based on the information received by the connection control unit; and
    the handover control unit is configured to carry out, in a case where the determination unit determines that the mobile station is a vehicle, control over the handover of the mobile station to the cell in the frequency band that is predetermined as the frequency band corresponding to the vehicle.

5. The control apparatus according to claim 3, wherein the determination unit is configured to determine, in a case where the information received by the connection control unit from the mobile station includes data indicating that the mobile station is a mobile station of a predetermined type, that the mobile station is the mobile station of the predetermined type.

6. The control apparatus according to claim 5, wherein the determination unit is configured to determine, in a case where information indicating connection completion which is received by the connection control unit from the mobile station includes data indicating that the mobile station is a mobile station of a predetermined type, that the mobile station is the mobile station of the predetermined type.

7. The control apparatus according to claim 6, wherein the information indicating the connection completion is RRC Connection Setup Complete.

8. The control apparatus according to claim 3, wherein the determination unit is configured to determine, in a case where connection request information received by the connection control unit from the mobile station includes data indicating that the mobile station is a mobile station of a predetermined type, that the mobile station is the mobile station of the predetermined type.

9. The control apparatus according to claim 8, wherein the connection request information is RRC Connection Request.

10. The control apparatus according to claim 3, wherein the determination unit is configured to determine, in a case where Attach Request received by the connection control unit from the mobile station includes data indicating that the mobile station is a mobile station of a predetermined type, that the mobile station is the mobile station of the predetermined type.

11. The control apparatus according to claim 3, wherein the determination unit is configured to determine, in a case where Direct Transfer received by the connection control unit from the mobile station includes data indicating that the mobile station is a mobile station of a predetermined type, that the mobile station is the mobile station of the predetermined type.

12. The control apparatus according to claim 3, wherein:
    the connection control unit is configured to receive paging information for calling the mobile station; and
    the determination unit is configured to determine, in a case where the paging information includes data indicating that the mobile station is a mobile station of a predetermined type, that the mobile station is the mobile station of the predetermined type.

13. The control apparatus according to claim 3, wherein:
    the determination unit is configured to determine whether the mobile station is a mobile station of a predetermined type in a predetermined state; and
    the handover control unit is configured to carry out, in a case where it is determined that the mobile station is the mobile station of the predetermined type in the predetermined state, control over the handover of the mobile station to a cell in a frequency band that is predetermined as a frequency band corresponding to the predetermined state.

14. The control apparatus according to claim 13, wherein:
    the determination unit is configured to determine whether the mobile station is a remotely-driven vehicle that is set as an object of remote driving; and the handover control unit is configured to carry out, in a case where it is determined that the mobile station is the remotely-driven vehicle, control over the handover of the mobile station to a cell in a frequency band that is predetermined as a frequency band corresponding to the remote driving.

15. The control apparatus according to claim 13, wherein:
the determination unit is configured to determine whether the mobile station is a remote driving vehicle configured to remotely drive a vehicle; and
the handover control unit is configured to carry out, in a case where it is determined that the mobile station is the remote driving vehicle configured to remotely drive the vehicle, control over the handover of the mobile station to a cell in a frequency band that is predetermined as a frequency band corresponding to the remote driving.

16. The control apparatus according to claim 1, wherein the handover control unit is configured to send, to the mobile station, wireless resource setting information corresponding to a frequency band that is predetermined as a frequency band corresponding to the mobile station of the predetermined type.

17. The control apparatus according to claim 16, wherein the wireless resource setting information is RRC Connection Reconfiguration.

18. A non-transitory computer-readable storage medium having stored thereon a program for causing a computer to function as:

a connection control unit configured to control communication connection with a mobile station; and a handover control unit configured to carry out, in a case where the mobile station is a mobile station of a predetermined type, control over handover of the mobile station to a cell in a frequency band that is predetermined as a frequency band corresponding to the mobile station of the predetermined type, wherein, when the program causes the computer to function as part of a control apparatus comprising the handover control unit configured to carry out control over handover of the mobile station to the cell in the frequency band that is predetermined as the frequency band corresponding to the mobile station of the predetermined type, as a result of the control apparatus carrying out the handover of the mobile station to the cell in the frequency band that is predetermined as the frequency band corresponding to the mobile station of the predetermined type, only mobile stations of the predetermined type are present in the cell in the frequency band that is predetermined as the frequency band corresponding to the mobile station of the predetermined type, and wherein mobile stations having types other than the predetermined type are not present in the cell in the frequency band that is predetermined as the frequency band corresponding to the mobile station of the predetermined type.

* * * * *